Feb. 22, 1955 T. M. McKEE 2,702,864
MEASURING DEVICE
Filed April 4, 1951 2 Sheets-Sheet 1
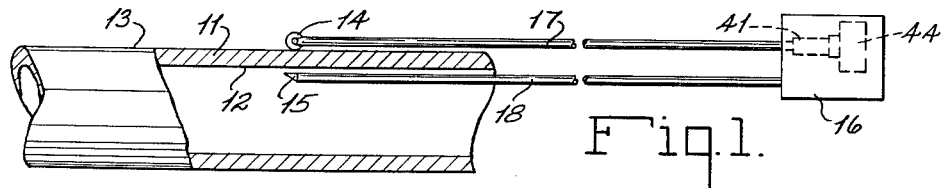
Fig.1.
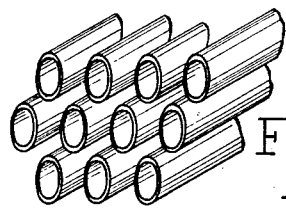
Fig.2.
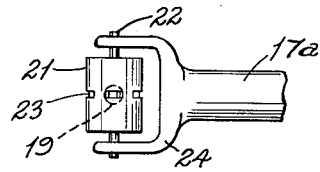
Fig.3.
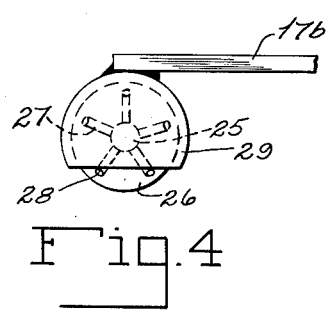
Fig.4.
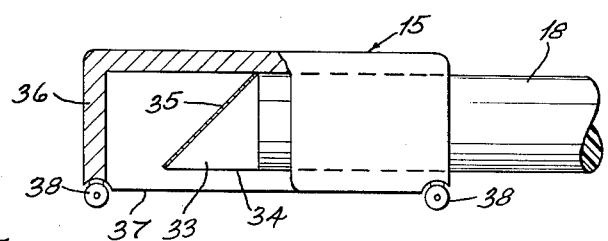
Fig.6.
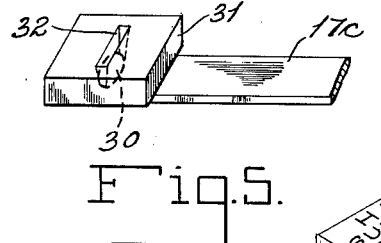
Fig.5.
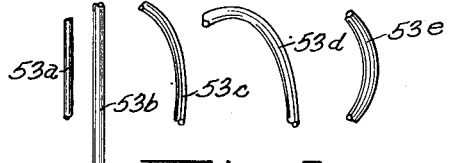
Fig.8.
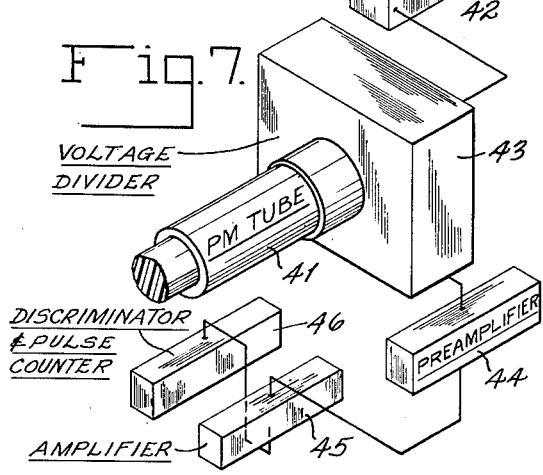
Fig.7.
Fig.9
INVENTOR.
THERESA M. McKEE
BY
ATTORNEYS Feb. 22, 1955   T. M. McKEE   2,702,864
MEASURING DEVICE
Filed April 4, 1951   2 Sheets-Sheet 2
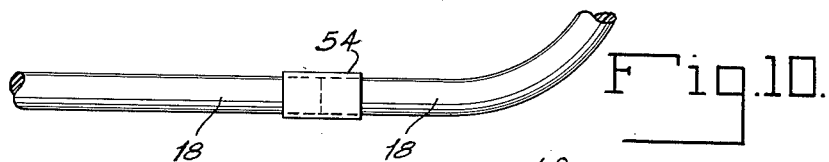
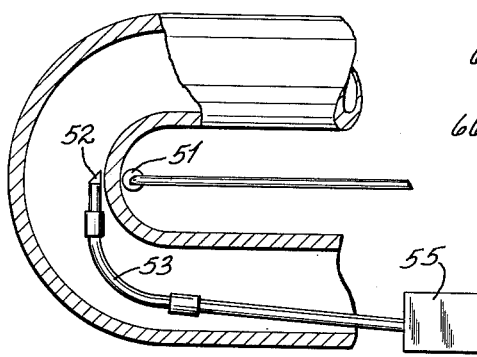
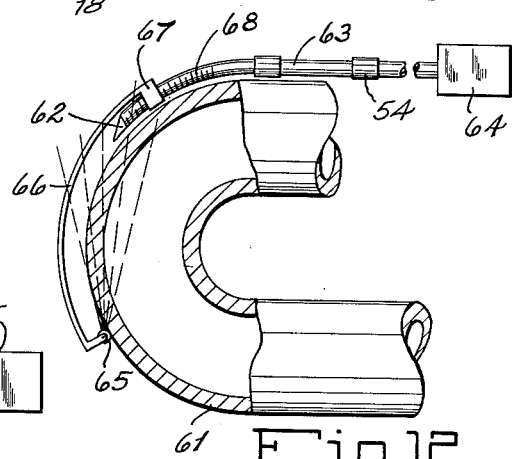
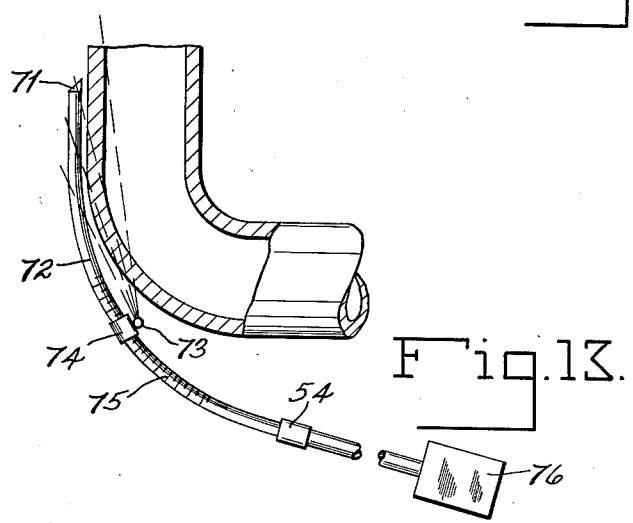
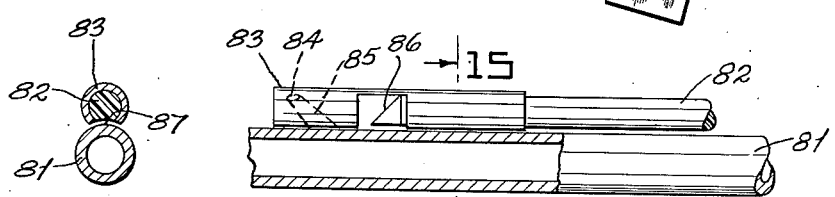
INVENTOR.
THERESA M. McKEE
BY
ATTORNEYS

United States Patent Office 2,702,864
Patented Feb. 22, 1955

2,702,864
MEASURING DEVICE

Theresa M. McKee, New York, N. Y., assignor to Texaco Development Corporation, New York, N. Y., a corporation of Delaware Application April 4, 1951, Serial No. 219,199

5 Claims. (Cl. 250—71)

This invention relates to the measurement of the thickness of the wall or walls of an object such as a pipe, tube, or like apparatus in assemblies difficult of access such as heat exchangers, stills, condensers and the like, including both straight and curved elements thereof.

Various methods and types of apparatus have been developed for measuring the thicknesses of the walls of receptacles, pipes and the like. Reissue Patent No. 22,531 of August 22, 1944, issued to D. G. C. Hare discloses a device for measuring the thickness of a wall from one side thereof wherein a beam of penetrative radiation is directed into the wall from one side and the amount of radiation scattered in the wall material and returned outwardly on the same side determined. Patent No. 2,346,486 issued April 11, 1944, to Hare discloses a device wherein a beam of penetrative radiation is directed into one side of a plate and the radiation passing through the plate is taken as an index of the thickness of the plate. Patent No. 2,349,429 issued on May 23, 1944, to Herzog and Stein discloses a method for measuring the thickness of a wall of a tubular object wherein penetrative radiation is passed tangentially through the walls of the object and the transmitted radiation determined. While the devices above-described are practical for most purposes wherein the objects to be examined are relatively accessible, they are not as practical and as convenient as desired in some instances, as in the examination of the walls of a bundle of tubes or pipes or in the examination of the wall of a curved hollow object in a position relatively difficult of access.

It is an object of this invention to overcome the above noted disadvantages of the prior art and to provide novel means for measuring the thickness of the wall of a relatively inaccessible object without the necessity of dismantling the assemblies involved.

Another object of the invention is the provision of relatively simple means for determining the thickness of relatively inaccessible objects, the means being flexible and easily and quickly adaptable to different situations.

Other objects and advantages of the invention will appear from the following description and claims together with the attached drawings wherein:

Figure 1 is a somewhat diagrammatic showing of an apparatus for measuring the thickness of a wall of a tube or pipe, ordinarily difficult of access, the tube being shown in cross section.

Figure 2 is a perspective of the end of a tube assembly illustrating the difficulties encountered in measuring the tube walls and the problem solved by the apparatus of Figure 1.

Figure 3 is a plan of a source of radiation adapted to be used in connection with the apparatus of Figure 1.

Figure 4 is a side elevation of another radiation source that can be used with the apparatus of Figure 1.

Figure 5 is still another modification of the source of penetrative radiation that may be used with the assembly of Figure 1.

Figure 6 is a detail taken partly in section of the preferred radiation detecting assembly used in conjunction with the assembly of Figure 1.

Figure 7 is a diagrammatic representation of the elements used with the assembly of Figure 6 for measuring the wall thickness of a tube.

Figure 8 is a side elevation of sections of radiation conductors that may be used to measure elements of differing shapes and in odd positions.

Figure 9 is a section through a radiation conductor illustrating means by which it may be strengthened structurally.

Figure 10 is a side elevation showing, in broken lines, the manner in which the radiation conductor sections can be connected.

Figure 11 is a modification of the invention wherein the wall thickness of a curved tube determined by the absorption of radiation passing therethrough.

Figure 12 represents a modification of the invention wherein the tangential principle is used in determining the thickness of a curved section of tubing, the tubing being shown in section.

Figure 13 represents a modification also suitable for measurement by the tangential method, the tubing therein being in section.

Figure 14 represents a modification wherein radiation is directed against one side wall of a tube to be measured, the radiation being scattered therein, returned outwardly on the same side of the wall, and measured on the same side of the wall.

Figure 15 is a section taken on the line 15—15 of Figure 14.

Briefly, the present invention can be described as a device for measuring the thickness of the wall of an object which is relatively difficult of access by reason of shape or by reason of close assembly with other apparatus wherein a source of penetrative radiation is provided in conjunction with a radiation-detecting element such as a Luminophor, the latter being connected to a radiation conductor capable of fabrication in different lengths and shapes and connected to a relatively remote electronic means capable of measuring the penetrative radiation intercepted by the radiation-detecting element. More specifically, the invention contemplates a relatively compact source of penetrative radiation and radiation detecting assemblies of relatively small sizes that are adaptable by selection of radiation conductors of different shapes and lengths to the measurement of the thickness of the wall of practically any relatively inaccessible piece of apparatus without the necessity of dismantling the apparatus. As hereinafter explained, the invention can be used with any of the three basic methods of using such radiation, i. e., by transverse passage of radiation through a wall, by back-scattering or by the tangential method.

Figures 1 to 7 inclusive illustrate the invention as applied to a determination of the thicknesses of the walls of a plurality of relatively inaccessible tubes or pipes assembled in a bundle as appears in Fig. 2. In such bundles which are found in heat exchangers, condensers and like apparatus, the tubes are positioned relatively close to one another and measurement of the thickness of the wall of any tube with conventional means is practically impossible without dismantling the entire apparatus.

The measuring device of Fig. 1 utilizes a method wherein a source of penetrative radiation such as radiation having the properties of an electromagnetic wave including X-rays, gamma rays, etc., is positioned adjacent one side of the wall to be measured and a radiation-detecting element is placed against the opposite side of the wall. The amount of the radiation passing from the source to the detecting element will be a function of the thickness of the wall. Thus with the absorption coefficient for the radiation rays known, the amount of transmitted radiation will provide an index to the thickness of the wall.

In the practice of such a method, it is difficult to locate the source of radiation and the detecting element exactly opposite one another. When such elements are not exactly opposite one another, the radiation measured may be that passed through the wall at an angle other than normal to the wall surface and may not be a correct measure of the wall thickness. This possibility is negatived by the apparatus shown herein.

Referring specifically to Fig. 1 wherein a section of a tube 11 is shown in cross section, the tube having an internal wall face 12 and external wall face 13, a wall thickness measuring assembly is provided including a source 14 of penetrative radiation, a radiation-detecting element 15, a base support or handle assembly 16 and supporting elements 17 and 18 for the source of radiation and the radiation-detecting element, respectively.

Radiation source 14 may take a number of different forms as shown in Figs. 3, 4 and 5. In each case, the primary source of radiation may be any suitable radioactive material such as the elements of the radium, actinium or thorium series which may emit penetrating gamma rays and are preferably mounted in the interior of a suitably shield element. In Fig. 3 the source proper, shown in dotted lines at 19, may be partly shielded by a shield of lead formed in a shape of a roller 21 having trunnions 22 extending therefrom. A material harder than lead is preferably used to form the external walls of the roller to resist abrasion. The roller is formed with a plurality of collimating slits 23 to permit the escape of radiation, the roller being supported in a yoke 24 formed at the end of a supporting arm 17a which corresponds to arm 17 of Fig. 1. With such a roller element, the source of radiation can be moved freely along the interior or exterior of tube 11 in contact with the walls thereof.

In Fig. 4 the radiation source proper is shown at 25, the source being mounted in the interior of a sphere 26 of lead preferably encased by a harder metal to prevent undue wear and abrasion. The sphere is formed with a series of channels 27 leading to apertures 28 on the external surface thereof whereby radiation is discharged from the external surface of the sphere. The surface of the sphere may be formed with a number of transverse channels connected as may be necessary to hold the elements of the sphere together, the radiation then being transmitted outwardly through the channels. The sphere 26 is mounted to rotate in a shielded casing 29, a portion of it is cut away as shown on the lower edge thereof. Casing 29 is mounted on the end of an arm 17b corresponding to arm 17 of Fig. 1. This, like the assembly shown in Fig. 3, provides a source of radiation that can be readily moved through the interior or along the exterior of a tube.

Fig. 5 shows a somewhat simpler form of apparatus wherein a source of penetrative radiation 30 is mounted within a block 31 of lead or similar shielding material, and a collimating slit 32 provided at one side of the block for escape of radiation from the interior thereof. Block 31 is mounted on the end of a supporting arm 17c which corresponds to the arm 17 in Fig. 1. This arrangement likewise provides a readily movable penetrative source of radiation.

Fig. 6 illustrates one form of radiation-detecting element that may be used for the element generally shown at 15 in Fig. 1. The supporting arm 18, formed of a suitable radiation conducting material such as Lucite has a so-called luminophor 33 mounted on the end thereof, the face 34 of the luminophor being exposed as shown and the face 35 being provided with a reflector so that scintillations developed within the luminophor by reason of radiation striking the face 34 are reflected into the end of Lucite rod 18 and transmitted to the opposite end thereof. Such luminophors are characterized by their rapid response to penetrative radiation with the resultant development of scintillations. Suitable substances include naphthalene, anthracene, zinc sulfide, zinc silicate and calcium tungstate. These materials and many others have been found to possess the property of converting penetrative radiation such as gamma rays to radiation in other ranges of the spectrum such as the ultra violet range. Stated otherwise, such substances possess the property of converting radiation of relatively short wave lengths to radiation of longer wave lengths which is capable of measurement by photo-electronic means such as apparatus including a photomultiplier tube.

Luminophor 33 and the end of tube 18 are preferably surrounded by a housing 36 having an open face 37 and rollers 38 to reduce friction.

Referring to Fig. 7 which illustrates the assembly to be connected to the end of radiation conductor 18 opposite the luminophor, a photomultiplier tube is shown at 41. It includes a cathode element usually disposed at the side or end thereof, which is exposed to the end of conductor 18 and receives radiation of relatively long wave length through the conductor from the luminophor. Such tubes are manufactured and sold by the Radio Corporation of America as types 391–A, 1P21, 1P22 and 1P28. In the assembly of Fig. 7, tube 41 is connected to a regulated high voltage supply 42 and a voltage divider 43, signals being taken from the tube through a preamplifier 44. The latter is connected to an amplifier 45 connected in turn to a discriminator and pulse counter 46. Such elements are well known in the art, attention being called to the description appearing in Nucleonics of January 1949, pages 16 to 23, and are capable of fabrication in a number of different forms.

For instruments of the type herein disclosed, it is preferred to mount the photo-multiplier tube 41 as shown in Fig. 1 in housing 16 together with the preamplifier 44, the remaining elements of the assembly shown in Fig. 7 being mounted elsewhere and connected to housing 16 by suitable conductors.

Referring back to Fig. 1, source 14 and luminophor assembly 15 can be oriented easily relative to one another by aligning and determining the proper lengths of supports 17 and 18. These supports can be virtually any length desired compatible with the strength of the materials used therein. While a plastic such as Lucite has been described in connection with support 18, it is to be understood that this Lucite may be shielded by a metal sleeve 18a (Fig. 9) of greater strength. Hence the length of support 18 is not dependent upon the strength of the radiation conductor used therein. Such a metal sleeve is preferably of a reflecting character such as polished silver or aluminum to inhibit the escape of radiation from the conductor.

With the radiation source and the luminophor property oriented, the thickness of the wall of a tube or pipe can be determined by introducing one or another inside the tube, the other element being disposed outside the tube directly opposite the first-mentioned element. Th combination thus formd can be moved likewise throughout the pipe and moved around to whatever positions may be desired to determine the thickness of all portions of the tube wall. The thickness of the wall is determined by measuring the amount of radiation that is transmitted through the wall to the luminophor. This radiation, with the absorption coefficient of the metal of the wall known for that particular radiation, furnishes information by which the final reading on the discriminator and pulse counter 46 becomes an index of the wall thickness. If desired, the instrument can be calibrated and checked from time to time by inserting materials of known thickness between the elements 14 and 15.

By reason of the positioning of the elements 14 and 15 at the end of the relatively elongated supports 17 and 18, the measuring assembly proper can be easily handled within the tube and can be utilized in a situation such as that shown in Fig. 2. This is enabled by reason of the relatively small transverse area taken up by the assembly, particularly the source of radiation which can be supported by relatively small rod 17 so that it can be inserted in relatively small spaces.

Fig. 11 illustrated somewhat diagrammatically the application of the invention to the measuring of the curved section of a tube. In this case, a source of radiation 51 is positioned adjacent the outside wall of the tube and a luminophor 52 on the end of a suitable radiation conductor 53 inserted within the tube and adjusted until a maximum reading is obtained, this maximum reading indicating that luminophor 52 is positioned opposite source 51. By the use of radiation conductors 53 of different radii of curvature and different lengths, examples of which are shown in Fig. 8 at 53a—53a, and the possible combinations thereof as by a connection of the type shown in Fig. 10 wherein the ends of the two radiation conducting elements 18 are highly polished and brought together as by a collar 54, a radiation detecting assembly can be provided to meet almost any contingency and to measure almost any element, however inaccessible.

When the length and shape of the radiation conductor is varied by the use of different sections of the types shown in Fig. 8, corrections will be applied to the final readings as there will be some loss in conduction which will vary with the lengths and shapes of the several sections used.

The radiation conductor in Fig. 11 is supported from an element 55 containing a photomultiplier tube and preamplifier in the same manner as shown in element 16 of Fig. 1, the assembly being connected to the other elements necessary to complete the measurement of the radiation as shown in Fig. 7.

Figs. 12 and 13 illustrate modifications wherein the principle of tangential radiation is employed.

In this method, the thickness of a curved wall is determined by positioning a source of radiation and a radiation-detecting element about the wall to be measured such that a beam of the radiation will pass tangentially through the wall from the source to the detector. The element responsive to the intensity of the transmitted beam of radiation is connected through a suitable amplifier to an indicating and recording device such as that shown in Fig. 7 which when properly calibrated provides a direct measurement of the thickness of the tube wall through which the beam of radiation passes. This method is fully explained in the above-mentioned patent to Herzog and Stein.

In the element shown in Fig. 12 wherein a tube 61 is shown having a curved section, a luminophor 62 is mounted on the end of a radiation conductor 63, preferably formed of Lucite or an equivalent radiation conductor, suitably reenforced as may be necessary by a metal sleeve, and connected to a housing 64 of the same type as shown at 16 in Fig. 1. By the use of connectors 54 of the type shown in Fig. 10, the length of the radiation conductor may be varied and sections of differing curvatures may be employed whereby the instrument can be adapted to a tube of any curvature.

A radiation source 65 is mounted on the end of an extending curved arm 66 secured in turn to a sleeve 67 adapted to be longitudinally adjusted and supported by conductor 63. If desired, the conductor may be calibrated as shown at 68 to facilitate proper positioning of sleeve 67. In this arrangement, source 65 may be positioned at any desired point with reference to luminophor 62, so that luminophor 62 measures the radiation passing tangentially through the adjacent section of the wall. The radiation intercepted by luminophor 62 is converted to radiation of longer wave length and eventually measured by an assembly of the type shown in Fig. 7.

Fig. 13 illustrates a modification of the device of Fig. 12 wherein a luminophor 71 is mounted on the end of a radiation conductor 72, the radiation conductor being capable of use in sections of varying degrees of curvature and in varying lengths by reason of one or more sections 54, the source of penetrative radiation in this case at 73 being mounted on a collar 74 slidable on a section of conductor 72. Again conductor 72 may be calibrated as shown at 75 to facilitate positioning of the collar. Conductor 72 terminates in an element 76 corresponding to element 16 of Fig. 1, the radiation conducted thereto being determined as explained in connection with Fig. 7.

By reason of their relatively compact nature, the minimum space required for their use and the flexibility in adjustment and in varying curvatures and lengths, the devices of Figs. 12 and 13 are particularly convenient in the measurement of the thicknesses of curved walls in installations that could not otherwise be reached.

Fig. 14 illustrates a modification that can be used for measuring the thickness of the walls of the tubes of an assembly such as shown in Fig. 2. A tube 81 is shown with a measuring assembly including a radiation conductor 82, suitably reinforced as desired and if required, and having a sleeve-like element 83 mounted on the end thereof. Sleeve 83 at its outer end carries a source of penetrative radiation 84, preferably shielded in lead, the radiation therefrom being directed through a collimating slot 85 onto the outer surface of the wall to be measured. The lead shielding not only protects the operator from the harmful effects of the radiation, but also serves to shield the source from a luminophor 86 mounted on the end of conductor 82. The section of the sleeve-like element 83 immediately below the luminophor is open as shown and exposed to the adjacent wall of the tube so that radiation directed on to the tube wall from source 84 through slot 85 which radiation is scattered in all directions, even back toward the source, will be detected by luminophor 86, converted to more easily detectable radiation, and conducted by conductor 82 to a photomultiplier cell or the equivalent as shown in Fig. 7.

The radiation that is finally determined can be used as a basis from which to calculate the wall thickness or the instrument can be calibrated to known tubing thicknesses as disclosed in Hare Patent Reissue No. 22,531.

Obviously the device can be used either inside or outside the tube. If used outside, it is preferred to form the wall contacting face of the sleeve-like element 83 in slight concave shape as shown at 87 in Fig. 15 to enable close engagement with the tube wall. If it is to be used internally, it is preferred to form the wall-contacting face of the sleeve-like element 83 with a convex face.

While the invention as herein described depends basically on the principles described in the aforementioned patents, it constitutes substantial improvement over the devices disclosed in such patents in that it provides means whereby the thicknesses of the walls of objects in relatively inaccessible places can be easily and quickly measured. By the use of a radiation conductor such as Lucite which can be formed with sections of different radii of curvature and in different lengths and interchanged as by the use of connecting collars 54, any of the modifications shown herein can be readily adapted to almost any situation that is encountered.

Obviously many modifications and variations of the invention, as hereinbefore set forth, may be made without departing from the spirit and scope thereof, and therefore only such limitations should be imposed as are indicated in the appended claims.

I claim:

1. Apparatus for measuring the thickness of the wall of a curved hollow object such as a still tube, still shell or the like wherein a beam of penetrative radiation is caused to pass through a section of the wall in a tangential direction and the amount of radiation absorbed in the wall section is determined comprising a luminophor for converting detected penetrative radiation into more easily measurable radiation, means to support said luminophor including a conductor for said converted radiation, means connected to said conductor to measure the converted radiation, a source of penetrative radiation mounted on said luminophor-supporting means and adjustable therealong to different predetermined positions relative to said luminophor to predeterminately position said luminophor and said source relative to the curved wall to be measured whereby said luminophor receives radiation from said source passing through a section of said wall in a tangential direction.

2. Apparatus for measuring the thickness of the wall of a curved hollow object such as a still tube, still shell or the like wherein a beam of penetrative radiation is caused to pass through a section of the wall in a tangential direction and the amount of radiation absorbed in the wall section is determined comprising a luminophor for converting detected penetrative radiation into more easily measurable radiation, means to support said luminophor including a conductor for said converted radiation, means connected to said conductor to measure the converted radiation, a source of penetrative radiation mounted on said conductor and adjustable therealong to different predetermined positions relative to said luminophor to position said luminophor and said source predeterminately relative to the curved wall to be measured whereby said luminophor receives radiation from said source passing through a section of said wall in a tangential direction, said conductor being variable in length and curvature.

3. Apparatus for measuring the thickness of the wall of a curved hollow object such as a still tube or the like wherein a beam of penetrative radiation is caused to pass through a section of the wall in a tangential direction and the amount of radiation absorbed in the wall section is determined comprising a radiation conductor, a source of penetrative radiation mounted on said conductor and a luminophor for converting detected penetrative radiation into more easily measurable radiation mounted on said conductor, said conductor being curved generally to approximately the same curvature as the wall section being measured, said source and said luminophor being adjustable relative to one another to predetermined positions whereby said luminophor receives radiation from said source passing through a section of the wall in a tangential direction.

4. Apparatus for measuring the thickness of the wall of a curved, hollow object such as a still tube, still shell, or the like, wherein a beam of penetrative radiation is caused to pass through a section of the wall in a generally tangential direction and the amount of radiation absorbed in the said wall section is determined, comprising a scintillator for converting penetrative radiation into light, a photoelectric device positioned at a substantial distance from said scintillator for converting variations in light produced by said scintillator into corresponding electrical variations, an elongated light pipe extending between the scintillator and the said device and coupled to both for conducting light from the former to the latter, and a quantity of radioactive material mounted on said pipe between said scintillator and said photoelectric device and near enough to said scintillator for the scintillator to receive penetrative radiation originating in said material and passing through said wall section to said scintillator.

5. Apparatus as defined in claim 4 in which the light pipe is curved generally to approximately the same curvature as the wall section the thickness of which is to be measured, and in which the radioactive material is adjustably mounted on and longitudinally of said pipe.

References Cited in the file of this patent

UNITED STATES PATENTS

| | | |
|---|---|---|
| 2,277,756 | Hare | Mar. 31, 1942 |
| 2,412,174 | Rhoades | Dec. 3, 1946 |
| 2,486,902 | Wolf | Nov. 1, 1949 |
| 2,501,173 | Herzog | Mar. 21, 1950 |
| 2,503,062 | Moriarty | Apr. 4, 1950 |
| 2,539,203 | Pohl | Jan. 23, 1951 |
| 2,550,107 | Coltman | Apr. 24, 1951 |
| 2,561,228 | Richey | July 17, 1951 |

OTHER REFERENCES

"Naphthalene Counters for Beta and Gamma Rays," Deutsch Nucleonics, March, 1948.